(12) United States Patent
Clark

(10) Patent No.: US 8,832,764 B2
(45) Date of Patent: Sep. 9, 2014

(54) BLOCK TROUBLESHOOTING

(75) Inventor: Stephen John Clark, Allen, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 484 days.

(21) Appl. No.: 13/293,602

(22) Filed: Nov. 10, 2011

(65) Prior Publication Data

US 2013/0120590 A1    May 16, 2013

(51) Int. Cl.
*H04N 7/173* (2011.01)
*H04N 17/00* (2006.01)
*H04N 21/442* (2011.01)

(52) U.S. Cl.
CPC ........ *H04N 17/004* (2013.01); *H04N 21/44209* (2013.01); *H04N 7/17309* (2013.01)
USPC ............................ 725/116; 725/107; 709/221

(58) Field of Classification Search
CPC .......... H04N 7/17318; H04N 7/17336; H04N 17/004; H04N 21/235; H04N 21/6168
USPC ..................... 725/93, 107, 116; 709/221, 222
See application file for complete search history.

(56) References Cited

U.S. PATENT DOCUMENTS

| | | | |
|---|---|---|---|
| 6,340,997 B1 * | 1/2002 | Borseth ........................ | 348/731 |
| 6,804,262 B1 * | 10/2004 | Vogel et al. ................... | 370/480 |
| 7,003,414 B1 * | 2/2006 | Wichelman et al. ........... | 702/76 |
| 7,080,398 B1 * | 7/2006 | Wichelman et al. .......... | 725/107 |
| 7,206,032 B2 * | 4/2007 | Shibusawa .................... | 348/732 |
| 7,490,345 B2 * | 2/2009 | Rakib et al. ................... | 725/111 |
| 7,697,453 B2 * | 4/2010 | Geile et al. .................... | 370/252 |
| 7,821,534 B2 * | 10/2010 | Somers ......................... | 348/181 |
| 8,613,033 B2 * | 12/2013 | Huffman et al. .............. | 725/116 |
| 2004/0068744 A1 * | 4/2004 | Claussen et al. ............... | 725/81 |
| 2005/0086682 A1 * | 4/2005 | Burges et al. .................. | 725/19 |
| 2011/0116500 A1 * | 5/2011 | Petry et al. .................... | 370/389 |

* cited by examiner

*Primary Examiner* — Annan Shang

(57) ABSTRACT

A system may include a media content processing subsystem associated with a subscriber. The media content processing subsystem may be configured to scan at least a subset of channels of a media broadcast to create a spectrum block map; determine a spectrum block of a channel of a media broadcast indicated as being a troubled channel; and identify, according to the spectrum block map, at least one additional channel of the media broadcast included in the spectrum block of the troubled channel.

21 Claims, 6 Drawing Sheets

Spectrum Block Map 145

| Channel Number | Frequency | Spectrum Block |
|---|---|---|
| 1 | 465 mHz | 1 |
| 2 | 465 mHz | 1 |
| 3 | 459 mHz | 0 |
| 4 | 459 mHz | 0 |
| 5 | 465 mHz | 1 |
| 6 | 471 mHz | 2 |
| 7 | 471 mHz | 2 |
| 8 | 471 mHz | 2 |
| 9 | 471 mHz | 2 |
| ... | ... | ... |
| 423 | 875 mHz | 70 |
| 424 | 875 mHz | 70 |
| 425 | 875 mHz | 70 |

FIG. 3

BLOCK TROUBLESHOOTING

BACKGROUND

The advent of computers, electronic communication, and other advances in the digital realm of consumer electronics has resulted in a great variety of enhanced programming, recording, and viewing options for users who view media content such as television programs. In implementing such enhanced options, media content processing subsystems (MCPSs) such as set top boxes have become important computing devices for accessing media content services and the media content within those services. In addition to supporting traditional analog broadcast video functionality, MCPSs also support an increasing number of digital services such as video-on-demand, internet protocol television ("IPTV"), and personal video recording.

A MCPS is typically connected to a media content provider, and includes hardware and/or software necessary to provide enhanced options for a subscriber television system at a subscriber location. A MCPS is usually configured to provide users with a large number and variety of media content choices. For example, a user may choose to view a variety of broadcast television programs, pay-per-view services, video-on-demand programming, Internet services, and audio programming via a MCPS.

While such systems are generally reliable, from time to time subscribers may have issues with their reception of media content from the media service provider. To learn of and remedy these issues, a customer service department of the media service provider may collect data regarding issues with the provided service. Such data is commonly referred to as a trouble ticket (or ticket), and may be stored in a system utilized by the customer service department. Trouble tickets in the system may be assigned to technicians to diagnose and resolve the issues. In some cases, the technicians follow a decision tree or flow chart to aid in diagnosing the issues. Nevertheless, due to the wide variety of available media content, some issues may be difficult to group, diagnose and correct.

BRIEF DESCRIPTION OF THE DRAWINGS

FIG. 3 illustrates an exemplary spectrum block map.

DETAILED DESCRIPTION

Figure 1:
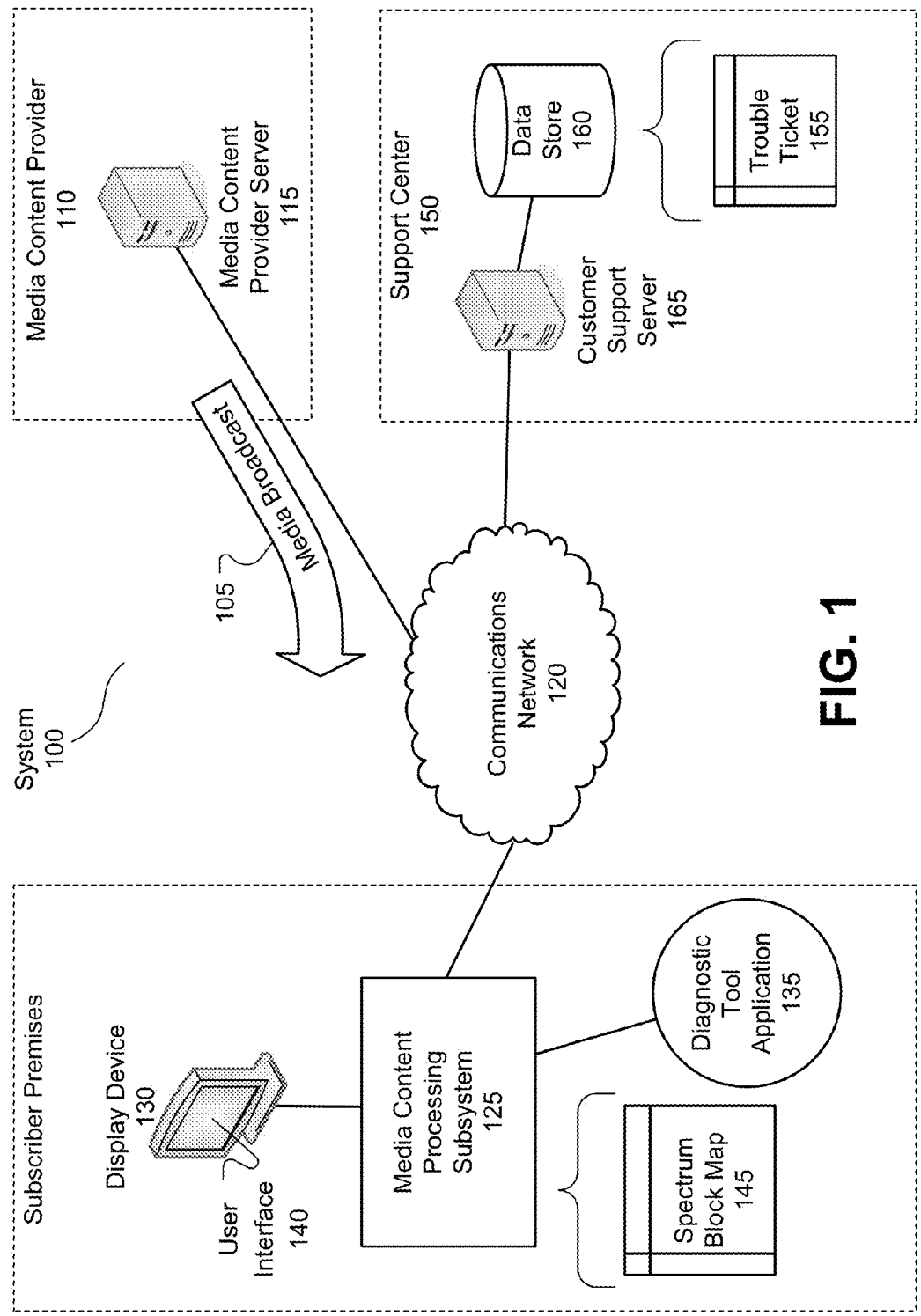
FIG. 1 illustrates an exemplary system 100 including a media content processing subsystem (MPCS) configured to provide enhanced diagnostic tools according to a spectrum block map.

In many media content broadcast systems, audio, video, and/or packet switched data is provided over the 54-875 Mhz spectrum. This spectrum may be divided into 6 Mhz spectrum blocks, where each block provides enough spectrum to transport 2-12 standard definition channels (SD) or 3-4 high definition channels (HD). Each channel has a corresponding channel identifier used by the MCPS to identify the channel to the subscriber. In some instances, these channel identifiers may be referred to as channel numbers.

Channel numbers do not fall in any predictable order relative to the channel frequency or spectrum block on which the channel is carried. For example, consecutively-numbered video channels 50 and 51 may not be contained within the same spectrum block, or even within adjacent spectrum blocks. The mapping of channel numbers to spectrum block may be further complicated by additional factors. From time to time, a Video Hub Office (VHO) may change the frequencies utilized by various channels, which may change the spectrum block in which a channel is located. Or, a mapping of channels to spectrum blocks may vary according to the location of the customer premises or from what remote system the customer premises received a video feed.

Troubleshooting video problems at a subscriber premises may be performed in part according to channel frequency. To obtain an associated frequency of a troubled channel, a technician may accesses an onboard diagnostic tool of the MPCS. To improve the ability of the technician to diagnose issues, the diagnostic tool application may be enhanced to create a spectrum block map indicating which channels are included in what the spectrum blocks and at what frequencies. Using the spectrum block map, the diagnostic tool application may aid in troubleshooting of trouble tickets and also the grouping of potentially-related trouble tickets.

For instance, based on which channels share the same spectrum block, it may be possible to determine whether a subscriber-reported issue with a particular channel is an issue with an individual channel or an issue with multiple channels within spectrum block. If other channels within the same spectrum block experience the same or similar issues, but not channels outside the spectrum block, then this information may be used to determine the next steps for diagnosing and resolving the issue. Issues with multiple channels within a spectrum block may point back to the video hub office where channels are grouped together in the spectrum blocks. Single channel issues with only a subset of the channel in a spectrum block may point back to a content provider.

Not only does a review of the channels sharing the same spectrum block assist the technician in fault isolation, but moreover the review may further allow for a the resolution of similar, but undetected, issues with other channels that are not frequently viewed by the subscriber.

As an additional advantage, the spectrum block mapping may be utilized to assist in identification and resolution of potentially-related trouble tickets. Indeed, a system may include multiple trouble tickets implicating various different channels at different subscriber sites. Nevertheless, by determining which other trouble tickets indicate issues with channels in the same spectrum block, those potentially-related issues may be grouped together and/or assigned to the same technician for resolution.

FIG. 1 illustrates an exemplary system 100 including a media content processing subsystem (MPCS) 125 configured to provide enhanced diagnostic tools according to a spectrum block map 145. The system 100 includes a media content provider 110 having a media content provider server 115 configured to provide a media broadcast 105 over a communications network 120. The system 100 further includes a MCPS 125 configured to receive a media broadcast 105 from the media content provider 110 to be displayed on a display device 130. The MCPS 125 also includes a diagnostic tool application 135 configured to create and utilize a spectrum block map 145 in order to facilitate the diagnosis and resolution of trouble tickets 155. The system 100 also includes a support center 150 including a data store 160 accessible through a customer support server 165 and configured to maintain the trouble tickets 155.

System 100 may take many different forms and include multiple and/or alternate components and facilities. While an exemplary system 100 is shown in FIG. 1, the exemplary components illustrated in Figure are not intended to be limiting. Indeed, additional or alternative components and/or implementations may be used. For example, while FIG. 1 illustrates a single media content provider server 115 in other embodiments the media content provider 110 may include multiple media content provider servers 115. As another example, while only a single MCPS 125 is shown, a system 100 may include multiple MCPS 125, each configured to communicate with one or more media content provider servers 115.

The terms media content instance (or instance of media content) may be used to refer generally to any television program, on-demand program, pay-per-view program, broadcast media program, video "on demand" program, commercial, advertisement, video, multimedia, movie, song, photograph, audio programming, network services (e.g., Internet), or any segment, portion, component, or combination of these or other forms of media content that may be presented to and experienced (e.g., viewed or heard) by a user. A media content instance may have one or more components. For example, an exemplary media content instance may include a video component and an audio component.

A channel may be a physical transmission medium such as a wire, or a logical transmission medium such as a multiplexed radio signal. The media content provider 110 may be configured to provide various types of media content instances over one or more channels. This collection of channels carrying instances of media content may be referred to as a media broadcast 105. The media content provider 110 may further be configured to provide program guide data corresponding to the instances of media content being made available on the channels. As some examples, the program guide data may include information such as title, subtitle, program summary, included performers, start and end time for broadcast, and any additional cost that may be incurred to view an instance of media content.

The media content provider 110 may include a media content provider server 115 configured to communicate with the MCPS 125 via one or more types of networks and communications links. Exemplary networks may include the Internet, an intranet or other private packet-switched network, a cable television network (e.g., a hybrid fiber-coax network), a wireless broadcast network (e.g., a satellite media broadcasting network or terrestrial broadcasting network), a telephone network, a provider-specific network (e.g., a Verizon® FIOS® network), an optical fiber network, or any other suitable network.

The MCPS 125 may be configured to communicate with and receive the media broadcast 105 containing a plurality of channels of media content instances from the media content provider 110. The MCPS 125 and media content provider 110 may communicate using various communication technologies, devices, media, and protocols supportive of remote data communications, including, but not limited to, cable networks, subscriber television networks, satellite networks, the Internet, intranets, local area networks, wireless networks (e.g., mobile telephone networks), optical fiber networks, data transmission media, communications devices, Transmission Control Protocol ("TCP"), Internet Protocol ("IP"), File Transfer Protocol ("FTP"), Telnet, Hypertext Transfer Protocol ("HTTP"), socket connections, Ethernet, video codecs including H.323, MPEG3, MPEG4, AVI, WMV, and SWF, and other suitable communications networks and technologies.

The MCPS 125 may be configured to tune to a particular channel of the media broadcast 105 in order to process media content provided on that channel. In some examples, the MCPS 125 may be capable of processing and/or displaying multiple channels of the media broadcast 105 substantially simultaneously. Additionally, the MCPS 125 may be configured to change the channel or channels being processed or displayed. For example, if the MCPS 125 receives a channel up or channel down command, the MCPS 125 may accordingly switch to the next or previous channel.

The display device 130 may be configured to receive a decoded instance of media content and present the media content. The display device 130 may include, but is not limited to, a display screen, a television, computer monitor, handheld device, speaker, or any other device configured to present media content from the media broadcast 105. The display device 130 may receive and process output signals from the MCPS 125 such that content of the output signals is received for experiencing by the user. Presentation of an instance of media content may include, but is not limited to, displaying, playing back, or processing the instance of media content, or one or more components of the instance of media content such as sound or video.

In some instances the MCPS 125 may be implemented as a standalone set-top box (STB) connected to a display device 130. In other instances, rather than requiring each display device 130 to have its own separate box, the MCPS 125 may be implemented as a client-server system in which a home media server gateway MCPS 125 is installed in the home. The home media server gateway MCPS 125 may be in communication with the media content provider 110, and each display device 130 may then use one of several thin client devices to access media content via the home media server gateway MCPS 125. In turn, the home media server gateway MCPS 125 may include one or more client handlers configured to respond to requests from the client devices. In some examples, the client functionality may be implemented substantially as embedded hardware and/or software included within the display device 130 itself.

The MCPS 125 may include a diagnostic tool application 135. The diagnostic tool application 135 may be provided as software that when executed by a processor of the MPCS 125 provides the operations described herein. Alternatively, the diagnostic tool application 135 may be provided as hardware or firmware, or combinations of software, hardware and/or firmware.

The diagnostic tool application 135 may be configured to provide a user interface 140 to allow for the operation and control of its functions by a user of the MCPS 125. The diagnostic tool application 135 may further provide feedback and other output to the user through the user interface 140 to aid the user in making operational decisions with respect to the system 100. The user interface 140 may make use of hardware and layered software included in the MCPS 125, such as hardware and software keyboards, buttons, microphones, display screens, touch screens, lights and sound producing devices. For example, user interfaces 140 may be displayed on the display device 130 and/or on a display screen of the MCPS 125 itself such as an LED display.

Figure 2:
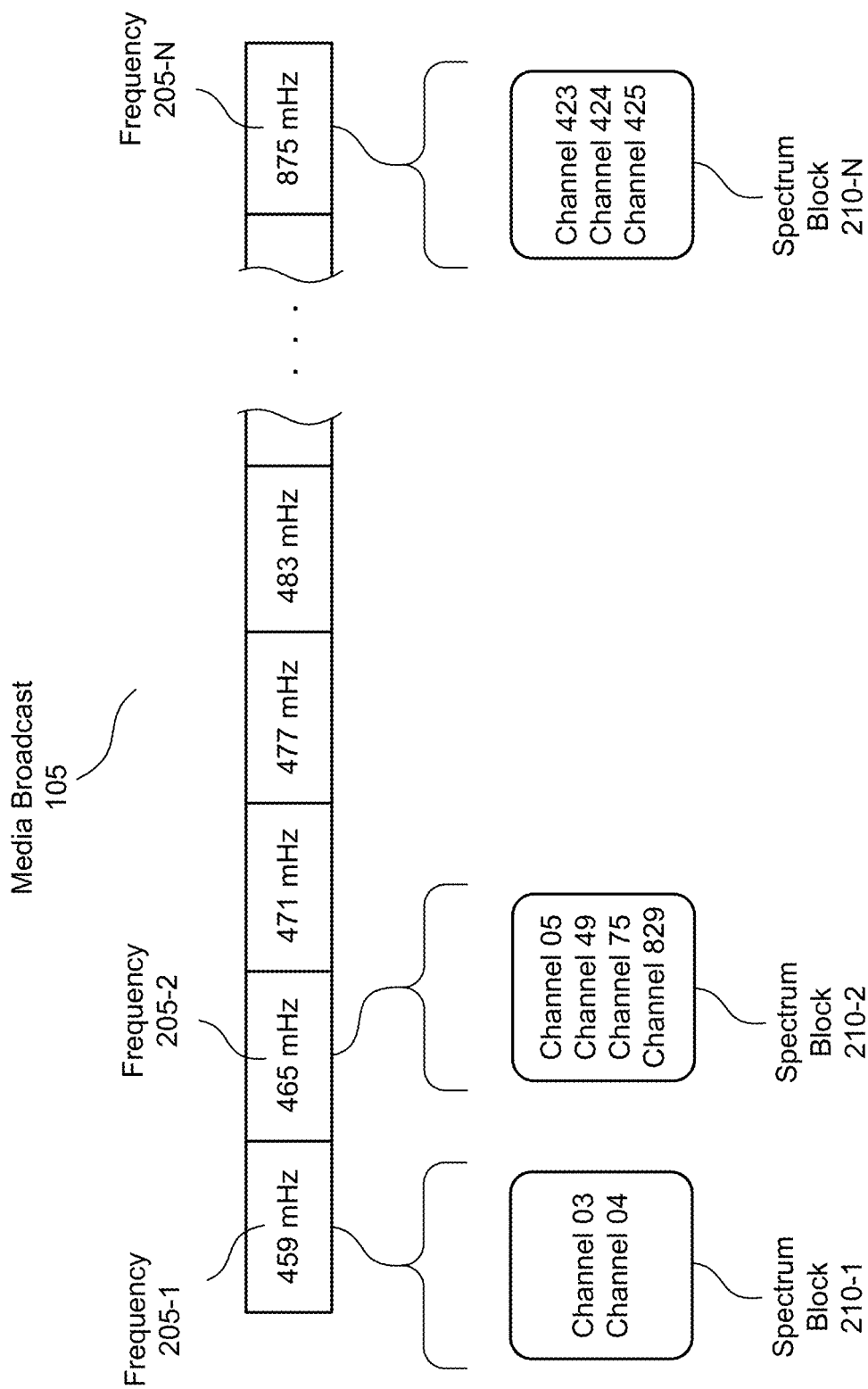
FIG. 2 illustrates an exemplary media broadcast configured to carry a plurality of instances of media content.
Figure 4:
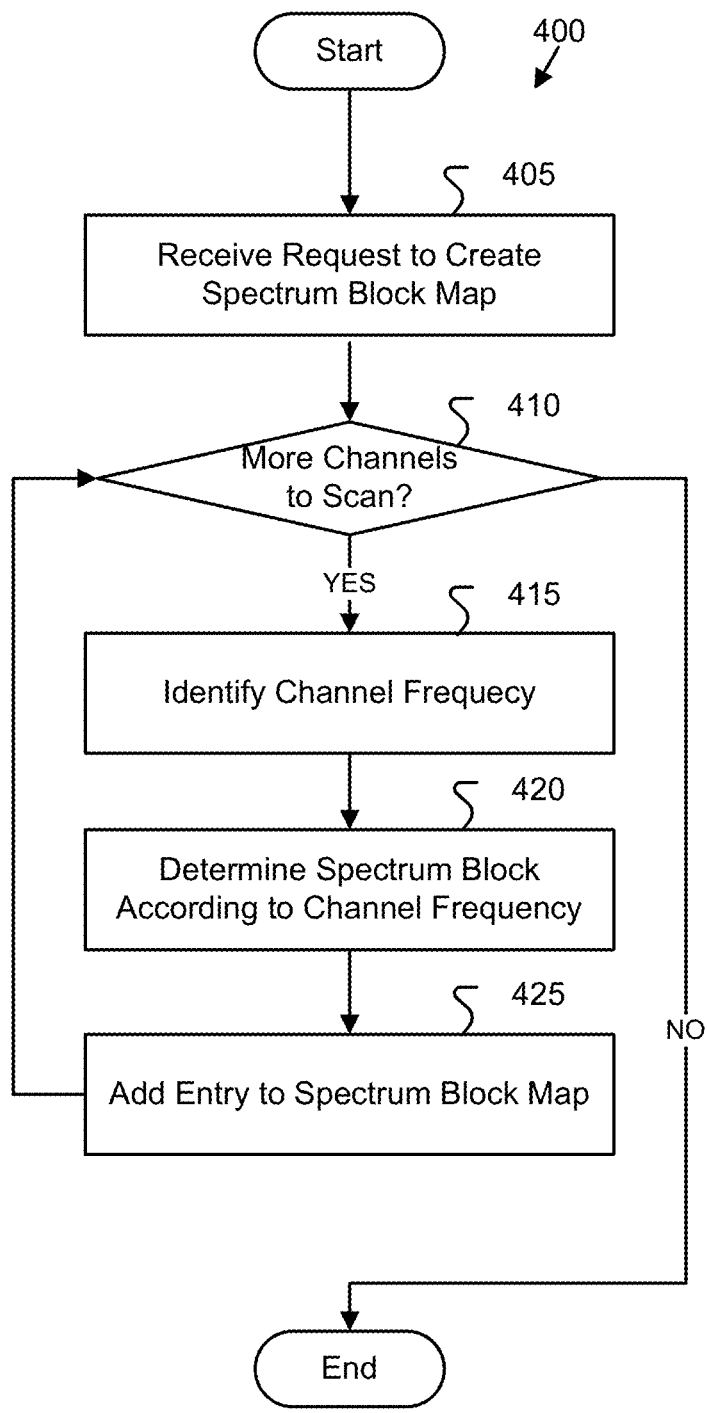
FIG. 4 illustrates an exemplary process for the creation of a spectrum block map.

As explained in further detail with respect to FIGS. 2-4, the diagnostic tool application 135 may be configured to create a spectrum block map 145. As explained in further detail with respect to FIGS. 5-6, the diagnostic tool application 135 may further be configured utilize the spectrum block map 145 to diagnose and link related issues with the media broadcast 105.

The system may further include a support center 150 configured to manage trouble tickets 155 associated with the media broadcast 105. A trouble ticket 155 may include collected data regarding issues with the provided service, such as reported issues with one or more channels of the media broadcast 105. Information for the trouble ticket 155 may be received from various sources, such as subscribers of the media content provider 110. Trouble ticket 155 may include additional information such as a status of the trouble ticket 155 (assigned to technician, closed, could not reproduce, etc.), notes taken by personnel of the support center 150 or technicians in the field, an identifier of a technician assigned to the issue, and/or links to other potentially-related trouble tickets 155.

The data store 160 may include one or more data storage mediums, devices, or configurations, and may employ various types, forms, and/or combinations of storage media, including but not limited to hard disk drives, flash drives, read-only memory, and random access memory. The data store 160 may include various technologies useful for storing and accessing any suitable type or form of electronic data, which may be referred to as content. Content may include computer-readable data in any form, including, but not limited to video, image, text, document, audio, audiovisual, metadata, and other types of files or data. Content may be stored in a relational format, such as via a relational database management system (RDBMS). As another example, content may be stored in a hierarchical or flat file system. As yet another example, content may be stored in the form of extensible markup language (XML) files. Exemplary data that may be stored in the data store 160 include the trouble tickets 155 discussed above, among other exemplary data.

The customer support server 165 may be configured to control access to the information of the data store 160. As some examples, the customer support server 165 may perform verification of login information or other credentials of users attempting to access the data store 160. Once a user is verified, the customer support server 165 may provide information to the data store 160 for the creation of trouble tickets 155, and may provide access to the trouble tickets 155 to customer support personnel and/or technicians in the field. In some instances, the MCPS 125 may be configured to selectively query, send, receive, and edit trouble ticket 155 information through communication with the customer support server 165 over the communications network 120.

In general, computing systems and/or devices, such as the MCPS 125 and the customer support server 165, may employ any of a number of computer operating systems, including, but by no means limited to, versions and/or varieties of the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OS X and iOS operating systems distributed by Apple Inc. of Cupertino, Calif., the BlackBerry OS distributed by Research In Motion of Waterloo, Canada, and the Android operating system developed by the Open Handset Alliance.

Computing devices such as MCPS 125 and customer support server 165 generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. In general, a processor or microprocessor receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein, such as data store 160, may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein. The diagnostic tool application 135 may be one such computer program product.

FIG. 2 illustrates an exemplary media broadcast 105 configured to carry a plurality of instances of media content. More specifically, the media broadcast 105 may carry multiplexed transmissions at a plurality of frequencies 205-1 through 205-N. These frequencies 205-1 through 205-N may be associated with a plurality of spectrum blocks 210-1 through 210-N. Each spectrum block 210 may thus provide enough bandwidth to transport multiple channels of media content. As an example, each spectrum block 210 may include approximately six MHz of spectrum capable of transporting 2-12 standard definition channels (SD) or 3-4 high definition channels (HD).

As shown in FIG. 2, spectrum block 210-1 corresponds with the six MHz portion of spectrum beginning at the frequency 205-1 of 459 MHz, and provides for the transport of channels 3 and 4. Spectrum block 210-2 corresponds with the six MHz portion of spectrum beginning at the frequency 205-2 of 465 MHz, and provides for the transport of channels 5, 49, 75 and 829. Spectrum block 210-N corresponds with the six MHz portion of spectrum beginning at the frequency 205-N of 875 MHz, and provides for the transport of channels 423, 424 and 425. Notably, consecutively-numbered channels are not necessarily contained within the same spectrum block 210, or even within adjacent spectrum blocks 210. While FIG. 2 illustrates an exemplary breakdown of a media broadcast 105 into a plurality of spectrum blocks 210, spectrum blocks 210 at different frequencies 205, including different amounts of spectrum, and/or included different portions of a channel lineup are possible.

FIG. 3 illustrates an exemplary spectrum block map 145. The spectrum block map 145 may indicate which channels are included in what the spectrum blocks 210, as well as what frequencies 205 are included in what the spectrum blocks 210.

The diagnostic tool application 135 of the MCPS 125 may be configured to create the spectrum block map 145 by scanning through the channels of the media broadcast 105. In some examples, the diagnostic tool application 135 may create the spectrum block map 145 by scanning a channel line-up associated with the subscriber's service plan. In such an example, the spectrum block map 145 may only include the channels that are accessible by the subscriber. In other examples, the diagnostic tool application 135 of the MCPS 125 may create the spectrum block map 145 by scanning the entire channel line-up, regardless of the subscriber's service plan. In this type of example the spectrum block map 145 may include entries for all channels of the media broadcast 105, regardless of whether they are accessible within the subscriber's service plan.

As shown in FIG. 3, the spectrum block map 145 may include a mapping of channels 3 and 4 to spectrum block 210 "0" beginning at 459 MHz, a mapping of channels 1, 2, and 5 to spectrum block 210 "1" beginning at 465 MHz, a mapping of channels 6, 7, 8, and 9 to spectrum block 210 "2" beginning at beginning at 471 MHz, as some examples.

FIG. 4 illustrates an exemplary process for the creation of a spectrum block map 145 based on a received media broadcast 105. The process 400 may be performed by various systems, such as the system 100 described above with respect to FIG. 1. For example, the process 400 may be performed at least in part by one of the diagnostic tool application 135 executed by an MPCS 125 receiving the media broadcast 105.

In block 405, the diagnostic tool application 135 receives a request to create a spectrum block map 145. For example, the diagnostic tool application 135 may receive a request from a technician to create the spectrum block map 145 as part of troubleshooting a trouble ticket 155. As another example, the diagnostic tool application 135 may automatically create the spectrum block map 145 periodically or upon receipt of an event, such as a notification of a change in a channel lineup.

In decision point 410, the diagnostic tool application 135 determines whether there are any additional channels of the media broadcast 105 to be included in the spectrum block map 145. For example, the diagnostic tool application 135 may begin at the first available channel in the media broadcast 105, and may continue until no more channels remain. As another example, the diagnostic tool application 135 may step through each channel of the media broadcast 105 that is available to the MPCS 125 according to the subscriber's service plan. If an additional channel remains to be mapped, control passes to block 415. Otherwise, the process 400 ends.

In block 415, the diagnostic tool application 135 identifies the frequency 205 of the channel being mapped. For example, the diagnostic tool application 135 may retrieve the frequency 205 of the channel from a tuner of the MCPS 125.

In block 420, the diagnostic tool application 135 determines the corresponding spectrum block 210 for the channel being mapped. For example, the diagnostic tool application 135 may consecutively number each block of spectrum according to frequency 205, and may identify the spectrum blocks 210 according to that number. In other examples, the diagnostic tool application 135 may use a predefined list of identifiers or names for the spectrum blocks 210.

In block 425, the diagnostic tool application 135 adds an entry to the spectrum block map 145 including the frequency 205 of the channel being mapped and the corresponding spectrum block 210 for the channel being mapped. For example, similar to as illustrated in FIG. 3, each scanned channel may be included as an additional row of information in the spectrum block map 145. Control then passes to decision point 410.

Figure 5:
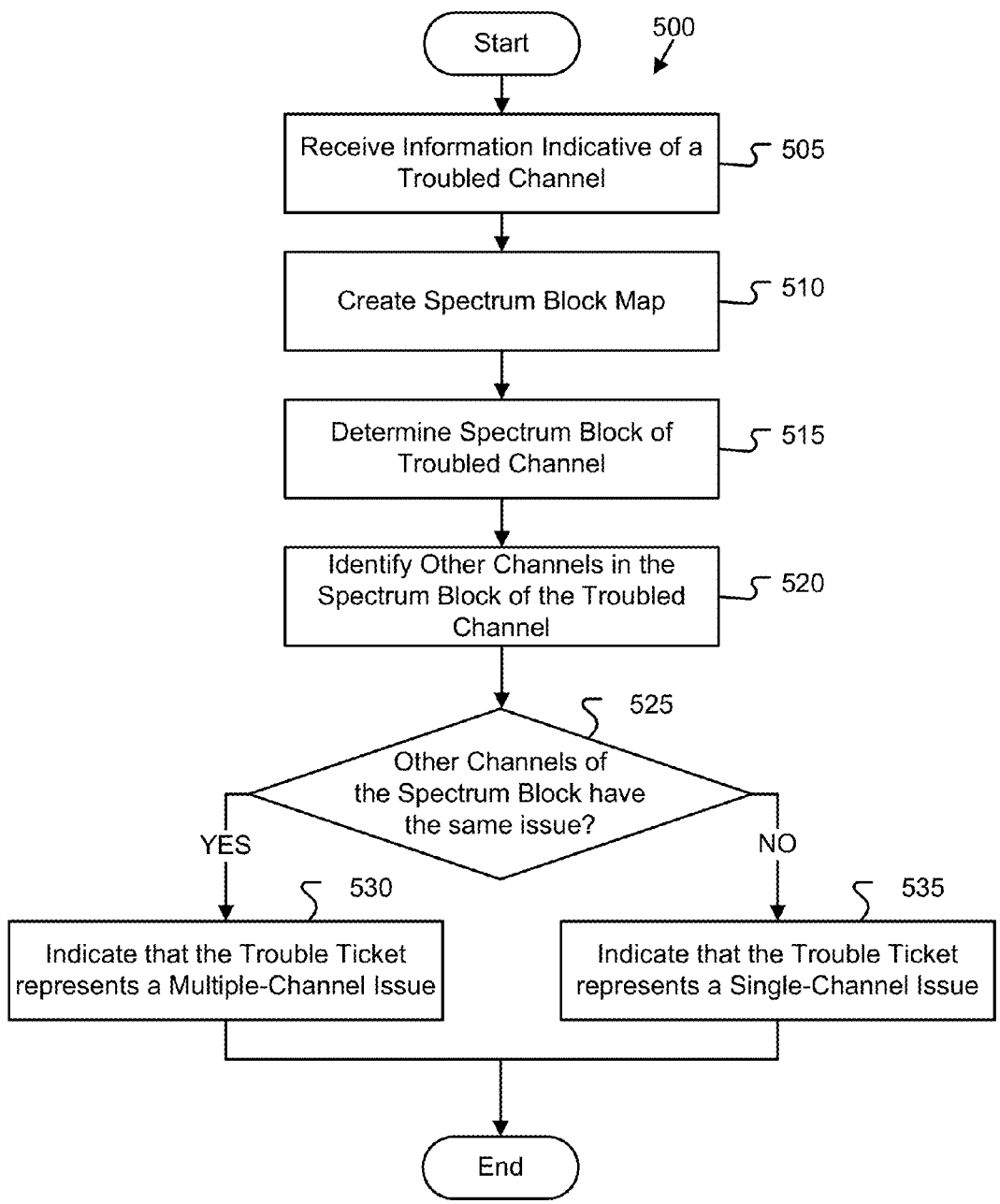
FIG. 5 illustrates an exemplary process for troubleshooting a trouble ticket using a spectrum block map.

FIG. 5 illustrates an exemplary process for troubleshooting a trouble ticket 155 using a spectrum block map 145. The process 500 may be performed by various systems, such as the system 100 described above with respect to FIG. 1. For example, the process 500 may be performed at least in part by one of the diagnostic tool application 135 executed by an MPCS 125.

In block 505, the diagnostic tool application 135 receives information indicative of a troubled channel. For example, a technician may be assigned a trouble ticket 155 of a subscriber, and may invoke the diagnostic tool application 135 of the subscriber's MCPS 125 to display and enter diagnostic information via the subscriber's display device 130. The diagnostic tool application 135 may accordingly receive the entered information.

In block 510, the diagnostic tool application 135 creates a spectrum block map 145. For example, the spectrum block map 145 may be created according to process 400 discussed above with respect to FIG. 4. In some examples, the spectrum block map 145 may already be created and up to date and block 510 may be omitted.

In block 515, the diagnostic tool application 135 identifies the spectrum block 210 of the troubled channel. For example, the diagnostic tool application 135 may perform a lookup of the spectrum block 210 of the troubled channel by using the spectrum block map 145.

In block 520, the diagnostic tool application 135 identifies other channels within the spectrum block 210 of the troubled channel. For example, the diagnostic tool application 135 may perform a lookup of the spectrum block 210 identifier in the spectrum block map 145, and may retrieve from the spectrum block map 145 identifiers of the other channels in the same spectrum block 210.

In block 525, the diagnostic tool application 135 determines whether the other channels within the spectrum block 210 of the troubled channel also experience the same issue. For example, the diagnostic tool application 135 may perform a scan of the other channels of the spectrum block 210, and may receive input from the technician indicating whether the same issue was experienced with the other channels the spectrum block 210. In other examples, the diagnostic tool application 135 may automatically analyze parameters of the other channels the spectrum block 210 (e.g., channel signal strength, presence of sync signal, etc.) while performing the scan to automatically determine whether the other channels of the spectrum block 210 experience the same issue.

For example, using the exemplary spectrum block map 145 illustrated in FIG. 3, if the trouble ticket 155 indicates an issue with channel 1, then channels 2 and 5 may additionally be scanned. Based on the scan, it may be determined whether other channels in the spectrum block 210 are experiencing the same issue.

In some examples, if an issue is determined with multiple channels in the spectrum block 210, the determination of an issue with the spectrum block 210 may be supplemented by a further determination of whether adjacent channels in other spectrum blocks 210, such as channels 3 and 4 in the example of FIG. 3, do or do not experience the issue. Indeed, a determination of an issue with multiple channels within spectrum block 210, but not with adjacent channels in another spectrum block 210 would further suggest an issue with equipment related to the spectrum block 210 as being a likely source of the issue.

If it is determined that the other channels within the spectrum block 210 of the troubled channel also experience the same issue, control passes to block 530. Otherwise, control passes to block 535.

In block 530, the trouble ticket 155 of a subscriber is marked as indicating a multiple-channel issue. Issues with multiple channels within a spectrum block 210 may point back to the video hub office where channels are grouped together in the spectrum blocks 210. Accordingly, further diagnosis of the issues indicated by the trouble ticket 155 may be performed at the video hub office. For example, a technician may analyze and diagnose multiplexing equipment at the video hub office to further diagnose the issue. After block 530, the process 500 ends.

In block 535, the trouble ticket 155 of a subscriber is marked as indicating a single-channel issue. Single channel issues with only a subset of the channels of a spectrum block 210 may point to issues at locations other than the video hub office. As an example, because the spectrum block 210 may appear to be properly carrying the various channels, further diagnosis of the issue may be performed at the content provider. In some instances, the content provider may be informed of the issue. After block 535, the process 500 ends.

Figure 6:
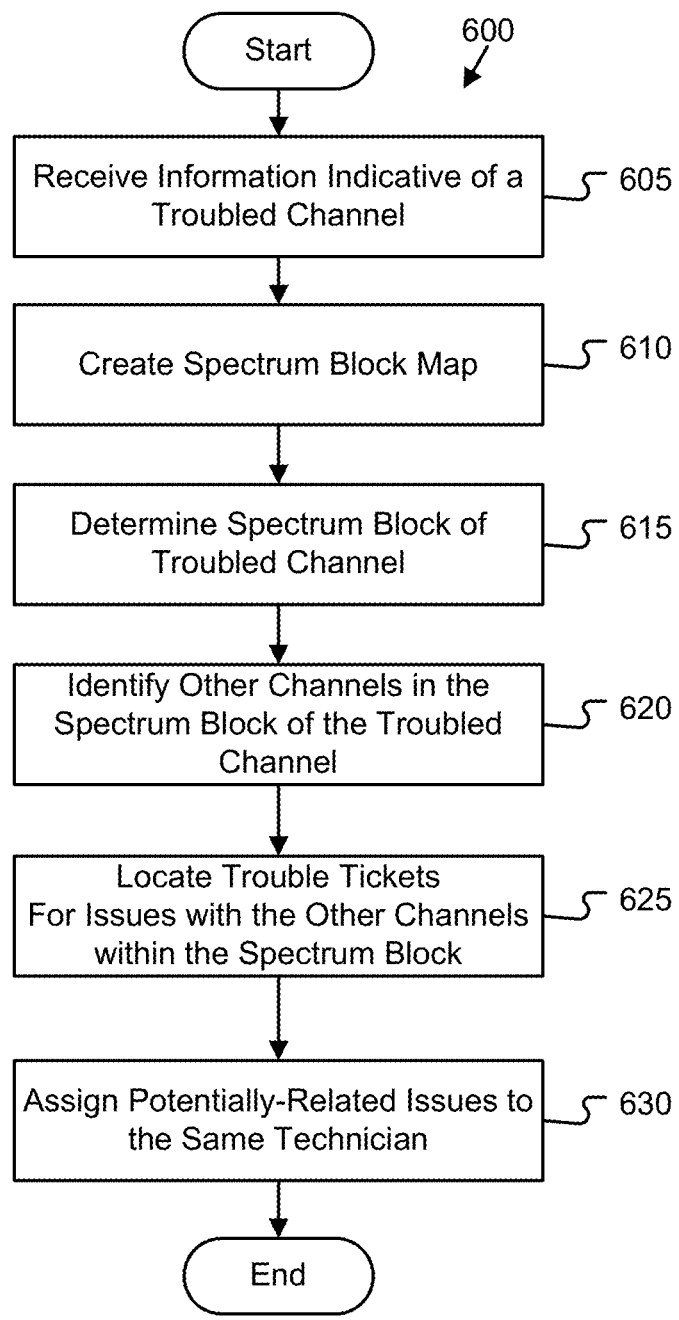
FIG. 6 illustrates an exemplary process for determining potentially-related trouble tickets based on a spectrum block map.

FIG. 6 illustrates an exemplary process for determining potentially-related trouble tickets 155 based on spectrum block 210. The process 600 may be performed by various systems, such as the system 100 described above with respect to FIG. 1. For example, the process 600 may be performed at least in part by one of the diagnostic tool application 135 executed by an MPCS 125.

In block 605, the diagnostic tool application 135 receives information indicative of a troubled channel. For example, a technician may be assigned a trouble ticket 155 of a subscriber, and may invoke the diagnostic tool application 135 of the subscriber's MPCS 125 to display and enter diagnostic information via the subscriber's display device 130. The diagnostic tool application 135 may accordingly receive the entered information.

In block 610, the diagnostic tool application 135 creates a spectrum block map 145. For example, the spectrum block map 145 may be created according to process 400 discussed above with respect to FIG. 4. In some examples, the spectrum block map 145 may already be created and up to date and block 510 may be omitted.

In block 615, the diagnostic tool application 135 identifies the spectrum block 210 of the troubled channel. For example, the diagnostic tool application 135 may perform a lookup of the spectrum block 210 of the troubled channel by using the spectrum block map 145.

In block 620, the diagnostic tool application 135 identifies other channels within the spectrum block 210 of the troubled channel. For example, the diagnostic tool application 135 may perform a lookup of the spectrum block 210 identifier in the spectrum block map 145, and may retrieve from the spectrum block map 145 identifiers of the other channels in the same spectrum block 210.

In block 625, the diagnostic tool application 135 locates trouble tickets 155 for issues with the other channels within the spectrum block 210. For example, the diagnostic tool application 135 may query a customer support server 165 for at least one additional trouble ticket 155 indicative of issues with at least a subset of the at least one additional channel, and may retrieve the at least one additional trouble ticket from the customer support server 165.

In block 630, the diagnostic tool application 135 links potentially-related trouble tickets 155 to the subscriber trouble ticket 155. For example, the diagnostic tool application 135 may send an update to the customer support server 165 configured to link at least a subset of the identified trouble tickets 155 to the trouble ticket 155 of a subscriber. These linked trouble tickets may, for example, be assigned to the same technician to be diagnosed and addressed together. After block 630, the process 600 ends.

CONCLUSION

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A system, comprising:
 a media content processing subsystem associated with a subscriber and configured to:

scan at least a subset of channels of a media broadcast to create a spectrum block map;
determine a spectrum block of a channel of a media broadcast indicated as being a troubled channel; and
identify, according to the spectrum block map, at least one additional channel of the media broadcast included in the spectrum block of the troubled channel.

2. The system of claim 1, wherein the media content processing subsystem is further configured to scan the at least one additional channel of the media broadcast included in the spectrum block to determine whether at least one additional channel of the media broadcast included in the spectrum block is also a troubled channel.

3. The system of claim 2, wherein the media content processing subsystem is further configured to scan adjacent channels to the channels of the media broadcast included in the spectrum block to determine whether the adjacent channels outside of the spectrum block of the troubled channel are also troubled channels.

4. The system of claim 2, wherein the media content processing subsystem is further configured to determine, based on whether the at least one additional channel is also a troubled channel, whether a trouble ticket identifying the troubled channel is indicative of a single channel issue or a multiple-channel issue.

5. The system of claim 4, wherein a determination of a multiple-channel issue directs further troubleshooting to a video hub office, and a determination of a single channel issue directs further troubleshooting to a content provider.

6. The system of claim 1, wherein the channel of the media broadcast is indicated as being a troubled channel according to a trouble ticket associated with the subscriber.

7. The system of claim 6, wherein the media content processing subsystem is further configured to locate trouble tickets having issues with the at least one additional channel of the media broadcast included in the spectrum block.

8. The system of claim 7, wherein the media content processing subsystem is further configured to:
query a customer support server for at least one additional trouble ticket indicative of issues with at least a subset of the at least one additional channel; and
retrieve the at least one additional trouble ticket from the customer support server.

9. The system of claim 7, wherein the media content processing subsystem is further configured to assign at least a subset of the located trouble tickets to a technician assigned the trouble ticket associated with the subscriber.

10. The system of claim 7, wherein at least one of the customer support server and the media content processing subsystem are configured to link at least a subset of the located trouble tickets to the trouble ticket associated with the subscriber.

11. The system of claim 1, wherein the media content processing subsystem is further configured to display a scan of channels available to the subscriber that are shared by the same spectrum block as the troubled channel.

12. The system of claim 1 wherein the media content processing subsystem is further configured to display a scan of channels that are shared by same spectrum block as the troubled channel, regardless of availability of the channels to the subscriber according to the service plan.

13. A method, comprising:
receiving an indication of a troubled channel based on a trouble ticket associated with a subscriber;
scanning, by a diagnostic tool application executed by a media content processing subsystem associated with the subscriber, at least a subset of channels of a media broadcast to create a spectrum block map;
determining a spectrum block of a channel of a media broadcast indicated as being a troubled channel; and
identifying, by the diagnostic tool application according to the spectrum block map, at least one additional channel of the media broadcast included in the spectrum block of the troubled channel.

14. The method of claim 13, further comprising scanning the at least one additional channel of the media broadcast included in the spectrum block to determine whether at least one additional channel of the media broadcast included in the spectrum block is also a troubled channel.

15. The method of claim 14, further comprising scanning adjacent channels to the channels of the media broadcast included in the spectrum block to determine whether the adjacent channels outside of the spectrum block of the troubled channel are also troubled channels.

16. The method of claim 14, further comprising determining, based on whether the at least one additional channel is also a troubled channel, whether the trouble ticket indicating the troubled channel is indicative of a single channel issue or a multiple-channel issue.

17. The method of claim 13, further comprising locating trouble tickets for issues with the at least one additional channel of the media broadcast included in the spectrum block.

18. The method of claim 17, further comprising assigning the at least one located trouble tickets to a technician assigned the trouble ticket indicating the troubled channel.

19. A non-transitory computer readable medium storing a software program, the software program being executable to provide operations comprising:
scanning at least a subset of channels of a media broadcast to create a spectrum block map;
determining a spectrum block of a channel of a media broadcast indicated as being a troubled channel; and
identifying, according to the spectrum block map, at least one additional channel of the media broadcast included in the spectrum block of the troubled channel.

20. The non-transitory computer readable medium of claim 19, further providing operations comprising:
scanning the at least one additional channel of the media broadcast included in the spectrum block to determine whether at least one additional channel of the media broadcast included in the spectrum block is also a troubled channel;
determining, based on the information indicative of whether the at least one additional channel is also a troubled channel, whether a trouble ticket indicating the troubled channel is indicative of a single channel issue or a multiple-channel issue.

21. The non-transitory computer readable medium of claim 19, further providing operations comprising at least one of:
locating trouble tickets for issues with the at least one additional channel of the media broadcast included in the spectrum block; and
assigning the at least one located trouble tickets to a technician assigned a trouble ticket indicating the troubled channel.

* * * * *